(12) United States Patent
Mitamura

(10) Patent No.: US 6,241,501 B1
(45) Date of Patent: Jun. 5, 2001

(54) TIRE VULCANIZER

(75) Inventor: Hisashi Mitamura, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/272,333

(22) Filed: Mar. 19, 1999

(30) Foreign Application Priority Data

Mar. 20, 1998 (JP) .................................................. 10-072067
Mar. 23, 1998 (JP) .................................................. 10-074115

(51) Int. Cl.[7] .................................................. B29C 35/02
(52) U.S. Cl. ........................................... 425/38; 425/58.1
(58) Field of Search ............................ 425/28.1, 38, 58.1

(56) References Cited

U.S. PATENT DOCUMENTS

| 5,198,234 | * | 3/1993 | Siegenthaler | ......................... | 425/58.1 |
| 5,225,138 | * | 7/1993 | Irie | ....................... | 425/58.1 |
| 5,352,104 | * | 10/1994 | Ichikawa et al. | ..................... | 425/58.1 |
| 5,441,393 | * | 8/1995 | Fujieda et al. | ....................... | 425/58.1 |

FOREIGN PATENT DOCUMENTS

| 1-113212 | 5/1989 | (JP) . | | |
| 4-371811 | * 12/1992 | (JP) | ................................... | 425/58.1 |
| 6-39851 | * 12/1992 | (JP) | ................................... | 425/58.1 |
| 6-328155 | 11/1994 | (JP) . | | |
| 9-225944 | 9/1997 | (JP) . | | |

* cited by examiner

*Primary Examiner*—James P. Mackey
(74) *Attorney, Agent, or Firm*—Oblon, Spivak, McClelland, Maier & Neustadt, P.C.

(57) ABSTRACT

A tire vulcanizer according to this invention comprises a swing loader for turning and carrying a vulcanized tire or cooled tire between a tire vulcanizing press and a post-cure inflator. The discharge position of the cooled vulcanized tire to a discharge conveyor is arranged within the rotating track of the swing loader between the tire vulcanizing press and the post-cure inflator, so that the discharge conveyor receives the cooled tire carried from the swing loader and discharges it to a carrying-out conveyor juxtaposed in the rear of the post-cure inflator. The swing loader comprises an expansible and contractible tire chuck capable of supporting the bead part of an unvulcanized or vulcanize tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame body for supporting the cylinder parts of the first and second hydraulic cylinders one above the other in such a way as to set the expanding direction of each rod in the cylinders to be in the reverse direction each other.

15 Claims, 15 Drawing Sheets

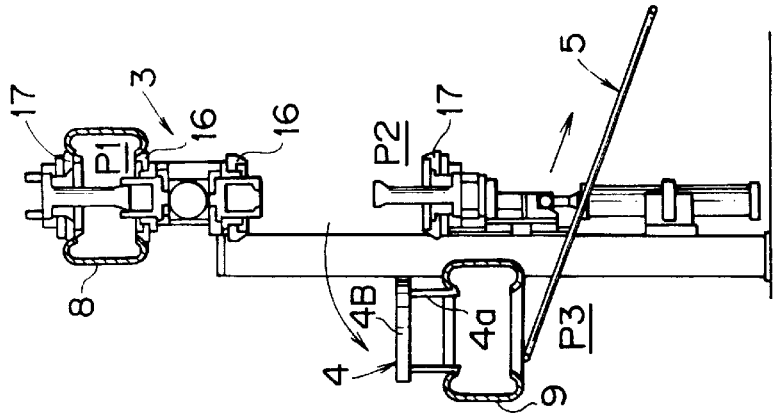
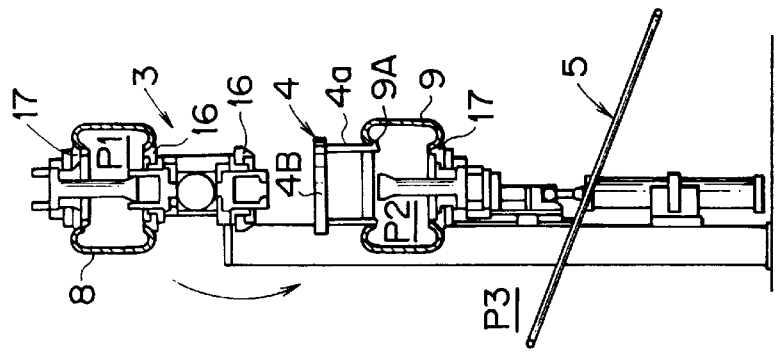
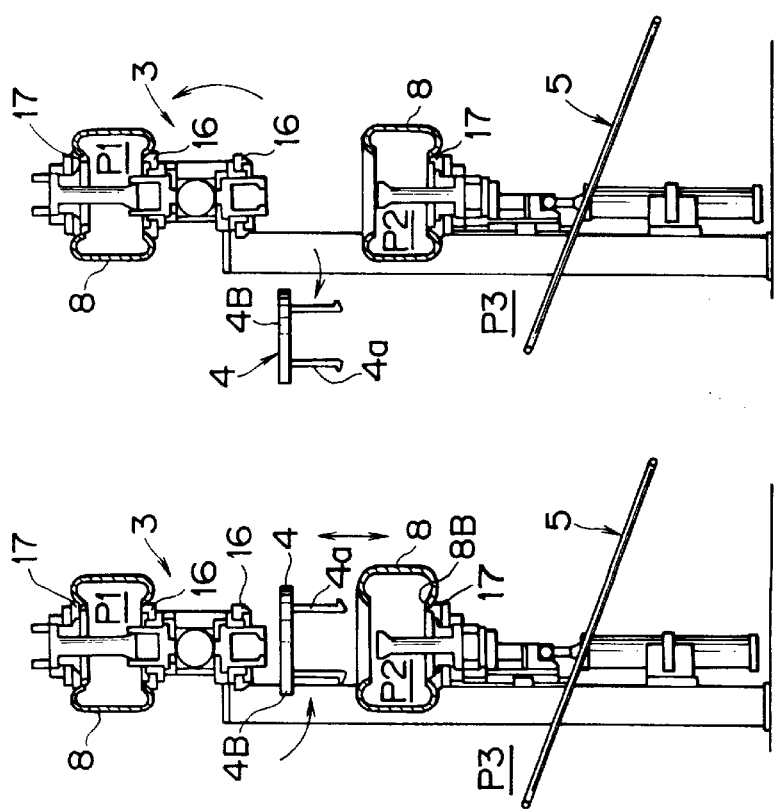

F I G. 7a
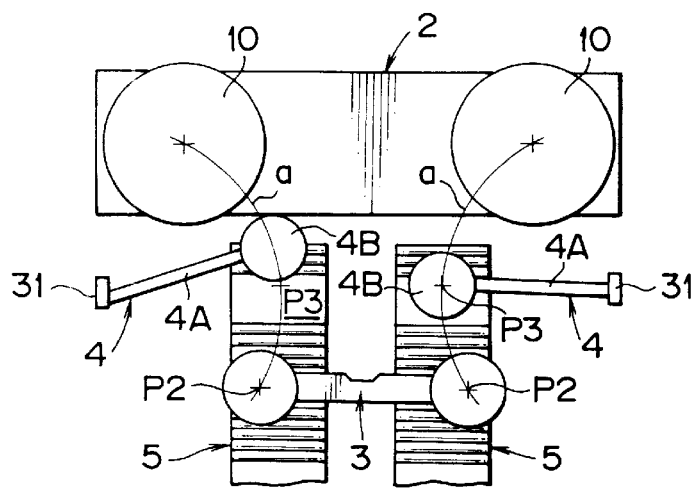
F I G. 7b
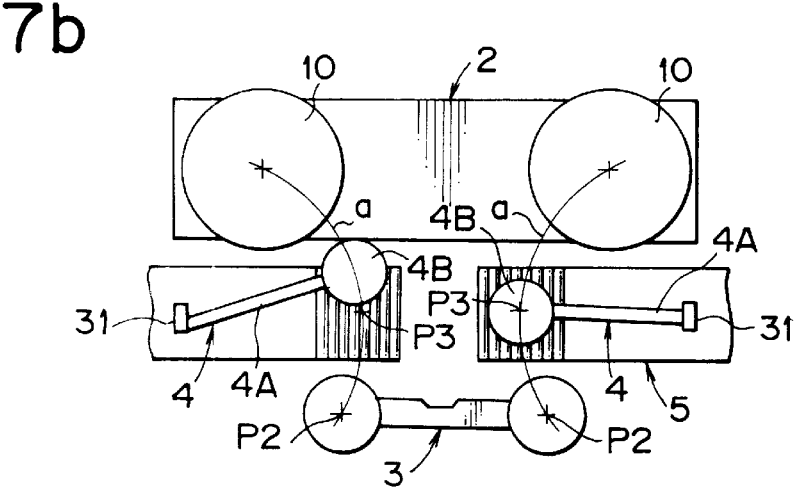
F I G. 7c
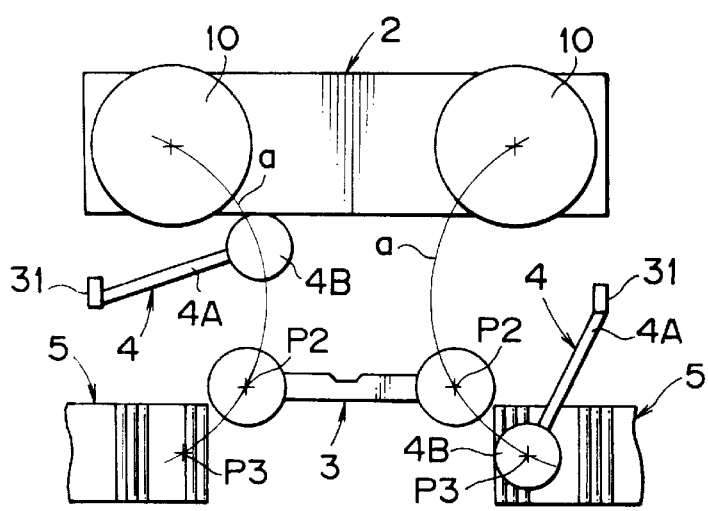

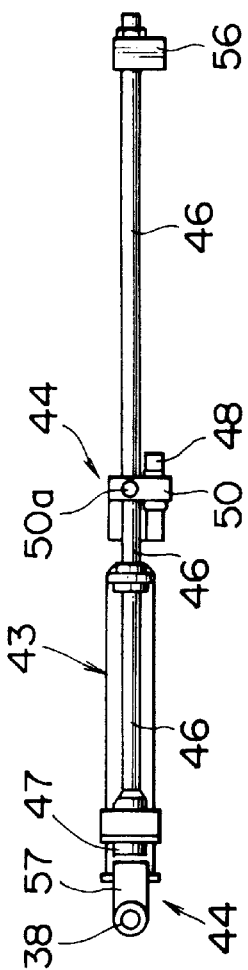
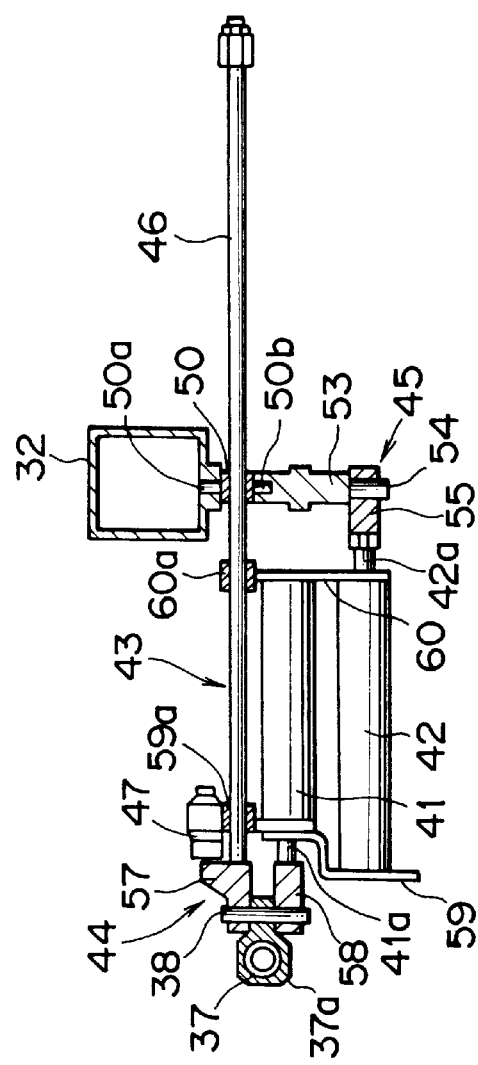
FIG. 12a
FIG. 12b

TIRE VULCANIZER

BACKGROUND OF THE INVENTION

1. Field of the Invention

This invention relates to a tire vulcanizer for manufacturing a tire by vulcanization molding a green tire followed by expansion cooling.

2. Description of the Related Art

One of conventional tire vulcanizers is disclosed in Japanese Utility Model Laid-Open No. 60-12421 which is hereby fully incorporated by reference. This tire vulcanizer comprises a tire vulcanizing press for vulcanization molding a green tire, two swing loaders for carrying a vulcanization molded tire from the tire vulaning press, a post-cure inflator for expansion cooling the vulcanized tire carried by each swing loader, and a roller conveyor for carrying the tire cooled by the post-cure inflator. The roller conveyor is attached to the post-cure inflator without obstructing the rise and fall of a lower bead part holding rim plate, and laid into horizontal and inclined states by an air cylinder connected thereto through a shaft.

In this tire vulcanizer, a vulcanized tire is carried out from the tire vulcanizing press by each swing loader and carried into the post-cure inflator by swing motion to shift it to expansion cooling process. The tire cooled by the post-cure inflator is carried out of the post-cure inflator by inclining the roller conveyer by the air cylinder, discharged to a carrying-out conveyor by a discharge conveyor inclined continuously to the roller conveyor, and carried to a tire inspecting machine or shipping place.

In the conventional tire vulcanizer, however, a large longitudinal space extending from the tire vulcanizing press to the carrying-out conveyor was required because of the serial arrangement of the tire vulcanizing press, the post-cure inflator, the discharge conveyor and the like over the longitudinal direction. Accordingly, the forward space of the tire vulcanizing press could not be sufficiently ensured when the tire vulcanizer was set in a facility such as factory, so that the work for replacing the mold of the tire vulcanizing press by a forklift or the like was difficult. Further, the setting space for a green tire placing base and a green tire truck to be arranged in the front of the tire vulcanizing press was reduced, which often caused their overflowing into a passage.

Further, the carrying-out loader of a conventional tire vulcanizer disclosed in Japanese Patent Application Laid-Open No. 1-113212 which is hereby fully incorporated by reference, for example, comprises a tire chuck 102 for holding a tire and a rotating arm 103 for the tire chuck 102 which are situated on the post-cure inflator side 101 of a tire vulcanizing press 100 as shown in FIG. 16, and it delivers the vulcanized tire from the tire vulcanizing press 100 to the post-cure inflator 101. Such a carrying-out loader is provided with two hydraulic cylinders 104, 105 for swing motion so that it can be stopped in three positions of a tire vulcanizing press internal prescribed position P0, a post-cure inflator internal prescribed position P2, and a waiting position P3.

However, since the two hydraulic cylinders 104, 105 had cylinder parts largely protruded toward the post-cure inflator 101 side in which the top ends of their rods were mutually joined, the post-cure inflator could not be arranged closely to the tire vulcanizing press side, resulting in an increase in space therefor. Further, since the rotating arm was also extended, the rotating moment was increased to make it difficult to hold the stop position precision.

SUMMARY OF THE INVENTION

This invention thus has an object to provide a tire vulcanizer allowing a more compact size of tire vulcanizer and the effective use of the space by providing a discharge position for cooled tire between the press and post-cure inflator of the tire vulcanizer, or designing the structure of swing loader.

A tire vulcanizer according to one preferred embodiment of this invention comprises a tire vulcanizing press for vulcanization molding a green tire, a post-cure inflator for expansion cooling the vulcanization molded tire, which is juxtaposed with the tire vulcanizing press, and a swing loader for turning and carrying the tire vulcanized by the tire vulcanizing press to the post-cure inflator.

In the above tire vulcanizer, the discharge position of the tire cooled by the post-cure inflator is preferably set within the rotating track of the swing loader.

When the discharge position is set within the rotating track, the arrangement mode of a discharge conveyor for receiving the cooled tire can be various selected so as to compress (reduce) the longitudinal space between the tire vulcanizing press and the post-cure inflator. Further, the swing loader can be used for carrying of both the vulcanized tire and the cooled tire.

The swing loader of the tire vulcanizer according to the preferred embodiment of this invention comprises an expansible and contractible tire chuck capable of supporting the bead part of an unvulcanized or vulcanized tire, a rotatable rotating arm having a top end provided with the tire chuck and a base end supported by the tire vulcanizing press, and a drive part consisting of a first hydraulic cylinder whose rod side is pivotally fixed to the tire vulcanizing press side, a second hydraulic cylinder whose rod side is pivotally fixed to the rotating arm side, and a frame body for supporting the cylinder parts of the first and second hydraulic cylinders one above the other in such a way as to set the expanding direction of each rod in the cylinders to be in the reverse direction each other.

According to this structure, the rotating arm can be shortened to minimize the rotating moment, whereby the stop position precision can be improved, and the whole tire vulcanizing device can be also made compact.

In the swing loader of the tire vulcanizer according to the preferred embodiment of this invention, preferably, the frame body of the drive part and the rotating arm-side second rod fixing part to which the rod end of the second hydraulic cylinder is pivotally fixed are slidably supported by a guide rod one end of which is rotatably supported by the tire vulcanizing press-side first rod fixing part to which the rod end of the first fluid pressure cylinder is pivotally fixed, and stoppers and cushioning members are provided on the guide rod and on the frame body and the second rod fixing part, respectively.

Since the cushioning members touch the stoppers regularly at the same angle (fight angle) even if the rotating arm is rotated, the stop position precision can be further improved with a high shock absorbing effect, and the durability can be also improved.

In the tire vulcanizer according to the preferred embodiment of this invention, preferably, the discharge position for discharging the tire cooled by the post-cure inflator is set within the rotating track of the swing loader, and the swing loader comprises an expansible and contractible tire chuck capable of supporting the bead part of an unvulcanized or vulcanized tire, a rotatable rotating arm having a top end provided with the tire chuck and a base end supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame body for supporting the cylinder parts of the first and second hydraulic cylinders one above the other in such a way as to set the expanding direction of each rod in the cylinders to be in the reverse direction each other.

According to this structure, the tire vulcanizer can be made much more compact.

BRIEF DESCRIPTION OF THE DRAWINGS

FIGS. 4a, 4b, 4c and 4d are essential views illustrating the procedure of tire carrying in the tire vulcanizer according to this embodiment;

FIGS. 7a, 7b, and 7c are typical views showing a still further possible embodiment of the tire vulcanizer according to this embodiment;

FIG. 12a is a plan view taken along the line C—C of FIG. 9 which shows the structure of the drive part of the carrying loader;

FIG. 12b is a vertical sectional view taken along the line C—C of FIG. 9 which shows the structure of the drive part of the carrying loader;

FIG. 14b is a vertical sectional view taken along the line D—D of FIG. 14a;

FIG. 15b is a vertical sectional view taken along the line E—E of FIG. 15a; and

DESCRIPTION OF THE PREFERRED EMBODIMENTS

One preferred embodiment of a tire vulcanizer according to this invention will be described below with reference to FIG. 1–FIG. 15.

Figure 1:
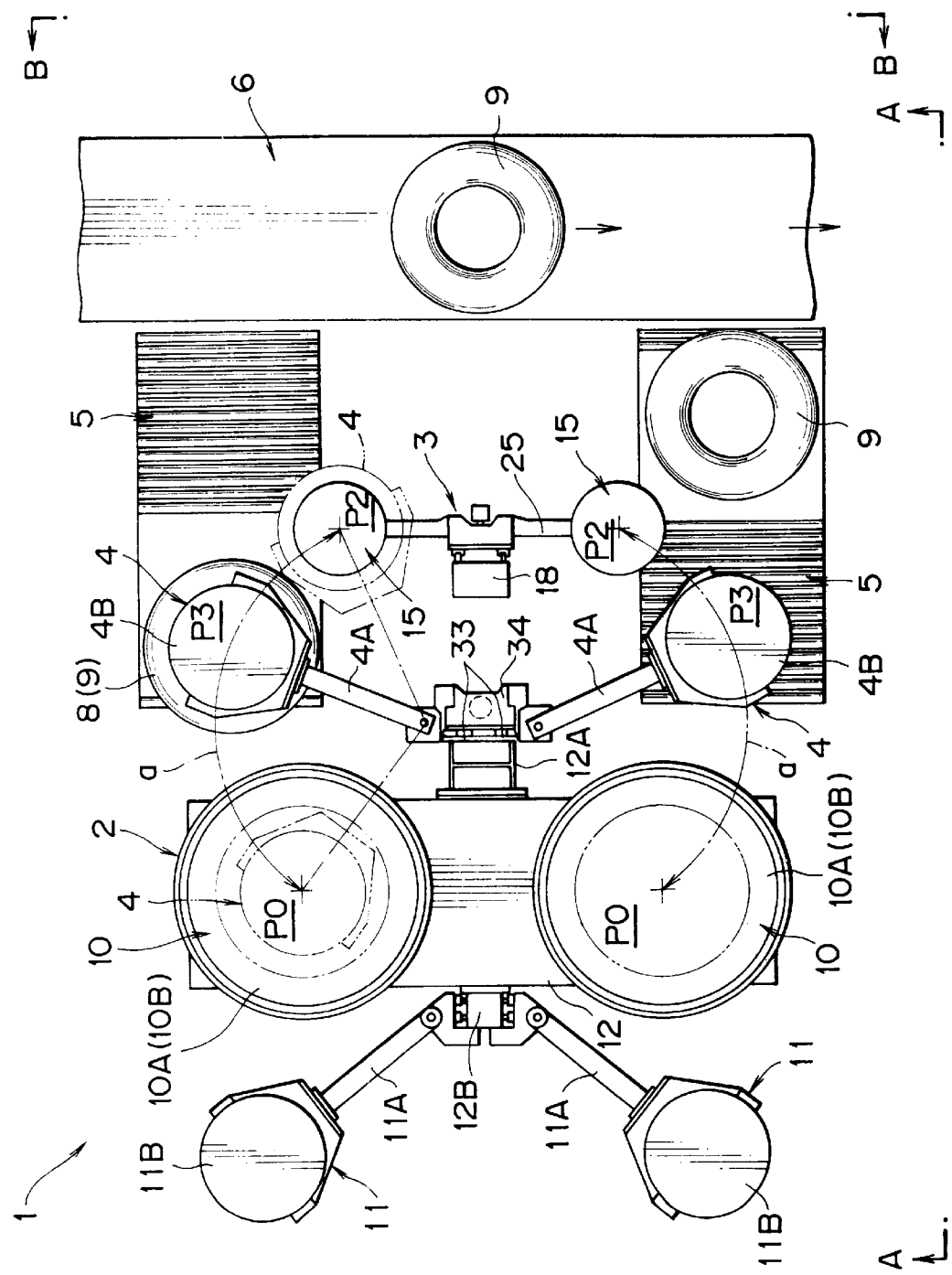
FIG. 1 is an upside view showing the structure of a tire vulcanizer according to one preferred embodiment of this invention.
Figure 2:
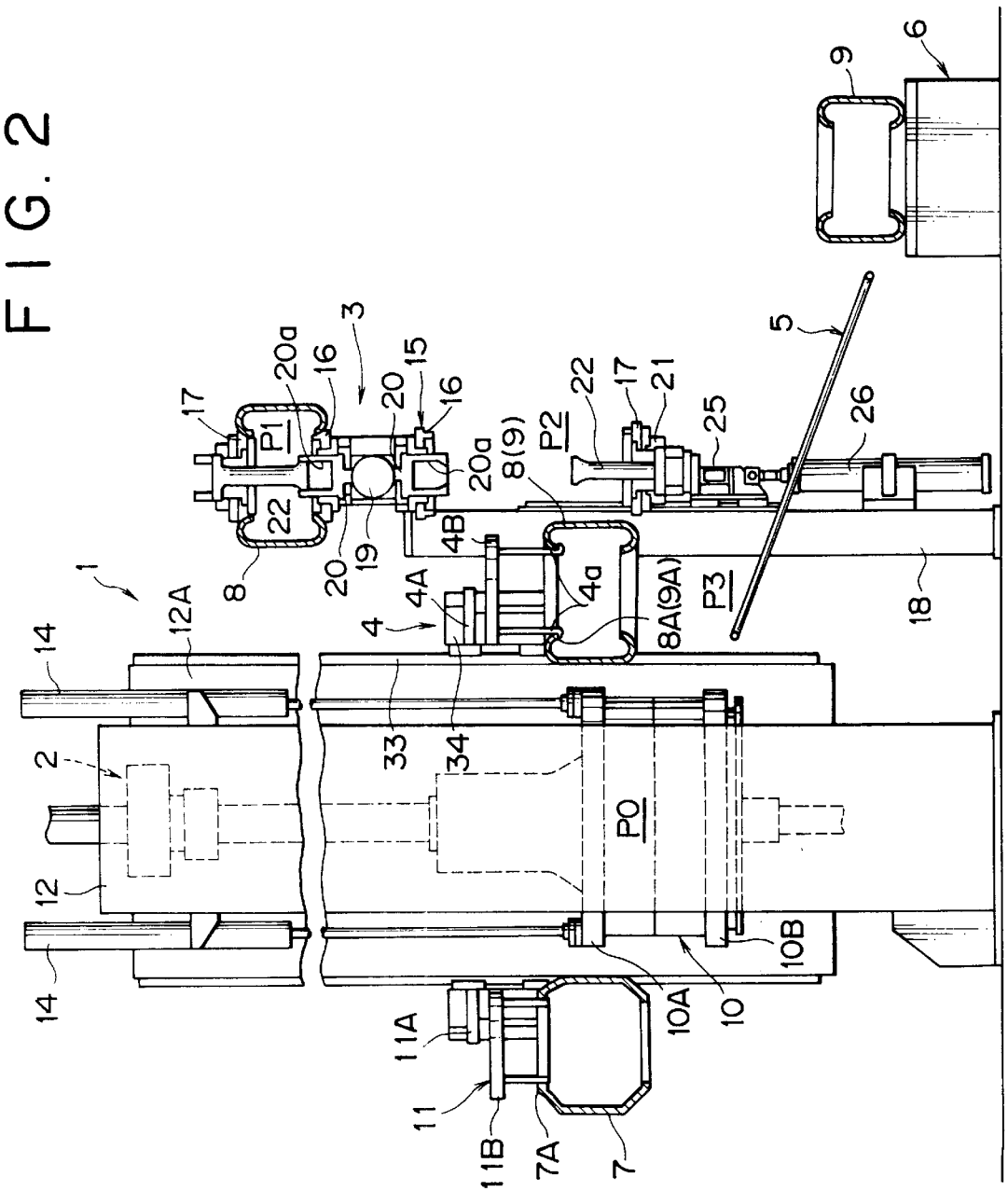
FIG. 2 is a side view taken along the line A—A of FIG. 1 which shows the structure of the tire vulcanizer.
Figure 3:
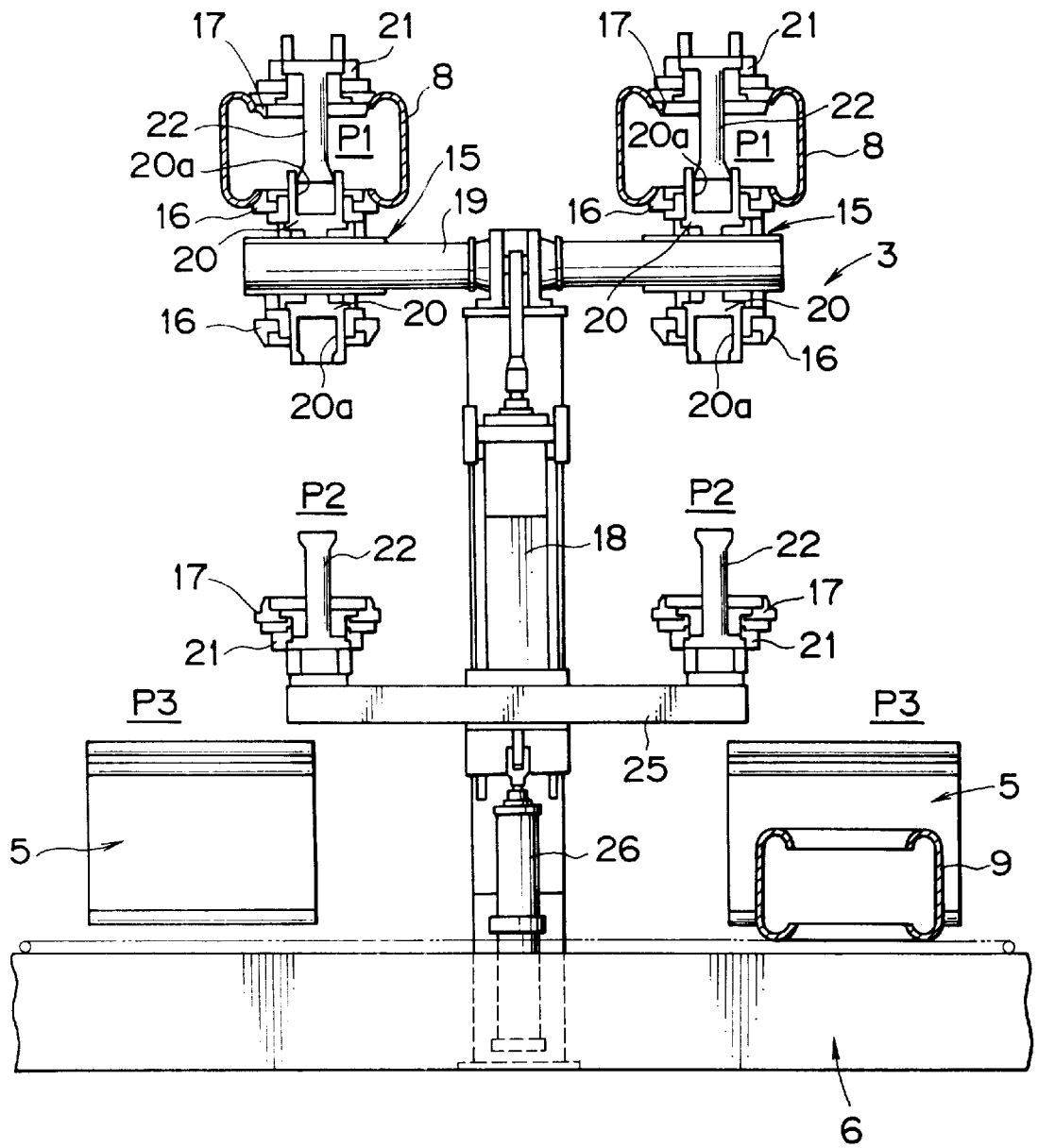
FIG. 3 is a rear view taken along the line B—B of FIG. 1 which shows the structure and arrangement relation of a post-cure inflator and a discharge conveyor.

In FIG. 1–FIG. 3, a tire vulcanizer 1 comprises a swig loader 11 for carrying a green tire 7 into a tire vulcanizing press 2, the tire vulcanizing press 2 for vulcanization molding the green tire, a post-cure inflator 3 for expansion cooling a vulcanization molded tire 8 (hereinafter referred to as "vulcanized tire 8"), two swing loaders 4 for carrying the vulcanized tire 8 or a cooled tire 9 between the tire vulcanizing press 2 and the post-cure inflator 3, and two discharge conveyors 5 for receiving and discharging the cooled tire 9 carried by each swing loader 4 to a carrying-out conveyor 6.

The tire vulcanizing press 2 shown herein is of double type capable of simultaneously vulcanization molding two green tires 7, and it comprises two molds 10 for vulcanization molding each green tire 7, two carrying-in swing loaders 11 for carrying the green tire 7 into each mold 10 from the front of the tire vulcanizing press 2, and each swing loader 4 for carrying out the vulcanized tire 8 from each mold 10 and carrying it into the post-cure inflator 3.

Each mold 10 is formed of vertically openable and closable upper and lower mold parts 10A, 10B. Each upper mold part 10A can be raised and lowered to each lower mold part 10B fixed to the lower part of a vulcanizer frame body 12 by a plurality of rising and falling cylinders 14 fixed to the outside of the frame body 12. Each carrying-in swing loader 11 is provided on a guide strut 12B stood in the front center position of the vulcanizer frame 12 so as to be capable of rising, falling and rotating, and it carries the green tire 7 to each mold 10 while holding the upper bead part 7A of the green tire 7 by a tire chuck 11B at the end of a rotating arm 11A (refer to FIG. 2).

In this tire vulcanizing press 2, the green tire 7 is vulcanization molded into a desired form by holding and carrying the green tire 7 into each mold 10 laid in open state (between the upper mold part 10A and the lower mold part 10B) by each carrying-in swing loader 11, and pressurizing the green tire 7 while supplying a heating medium thereto under the closed state of each mold 10.

The post-cure inflator 3 shown herein is of double type capable of simultaneously expansion cooling four vulcanized tires 8 in total by twos, and it is arranged in the rear of the tire vulcanizing press 2 with a prescribed space. The post-cure inflator 3 is provided with two rim mechanisms 15 for nipping the vulcanized tire 8 to be carried (refer to FIG. 3). Each rim mechanism 15 comprises two sets of contactable and separable upper and lower rims 16, 17 arranged in such a manner as to be reversible between a waiting position P1 and a nipping position P2 around a reversing shaft 19 supported by a center frame 18, and the vulcanized tire 8 is expansion cooled by supplying high pressure air (cooling air) into the vulcanized tire 8 in each position P1, P2. The reversion of each position P1, P2 is performed by rotating the reversing shaft 19 every 180° by the reversing cylinder and link mechanism provided on the center frame 18.

Each upper rim 16 is mounted on the reversing shaft 19 through a pedestal 20, and set in each position P1, P2. Each pedestal 20 has a recessed part 20a. Each lower rim 17 is mounted on a pedestal 21 in opposition to each upper rim 16, and a locking shaft 22 fittable to the recessed part 20a is supported on each pedestal 21.

The upper and lower rims 16, 17 situated in each waiting position P1 are integrated together by the fitting of the recessed part 20a to the locking shaft 22 to nip the vulcanized tire 8. Each lower rim 17 situated in each nipping position P2 is mounted on a rising and falling frame 25 raised and lowered along the center frame 18, and the nipping of the vulcanized tire 8 with each upper rim 16 or the release of the nipping thereof can be performed by raising and lowering the rising and falling frame 25 by a nipping cylinder 26.

In the post-cure inflator 3, the vulcanized tire 8 carried from the tire vulcanizing press to each nipping position P2 is supported on each lower rim 17, which then nips the vulcanized tire 8 with each upper rim 16 by raising the rising and falling frame 25. After the vulcanized tire 8 is nipped to supply cooling air into the vulcanized tire 8, the vulcanized tire 8 is revered from the nipping position P2 to the waiting position P1 by rotating the reversing shaft 19 by 180°, and the expansion cooling stroke is executed nearly 2 times the vulcanizing time.

Each swing loader 4 is arranged on the rear center frame 12A (on the side opposed to the post-cure inflator 3) of the vulcanizing frame 12 of the tire vulcanizing press. On the other hand, the carrying-in swing loader 11 is arranged on the center frame 12B thereof. Each swing loader 4 is rotatably arranged with its axis of rotation on a guide base 34 rising and falling in a guide rail 33 provided along the rear center frame 12A, and the swing loader 4 is provided with a rotating arm 4A and a tire chuck 4B.

The rotating arm 4A is supported on the guide base 34 in such a manner that the tire chuck 4B is rotatable, and the tire chuck 4B (each tire 8, 9) is rotated between the tire vulcanizing press 2 and the post-cure inflator 3 by a plurality of hydraulic cylinders not shown. The tire chuck 4B comprises three or more claws 4a radially expanded and contracted at once, which are circumferentially arranged at equal intervals, so that each upper bead part 8A, 9A of the vulcanized tire 8 or the cooled tire 9 is held by inserting each claw 4a laid in contracted state into each tire 8, 9 and expanding it radially outward, and each tire 8, 9 is released by contracting each claw 4a radially inward again.

Each swing loader 4 holds the vulcanized tire 8 from the position P0 within each mold 10 of the tire vulcanizing press 2, and turns it to each nipping position P2 (on each lower rim 17) of the post-cure inflator 3, where the vulcanized tire 8 is supported on each lower rim 17 and shifted to the expansion cooling stroke by the post-cure inflator 3. Further, each swing loader 4 holds the expansion cooled vulcanized tire 9 from each nipping position P2 of the post-cure inflator 3, carries it to the discharge position P3 in the rotating track (a) between the tire vulcanizing press 2 and the post-cure inflator 3, and delivers the vulcanized tire to a discharge conveyor 5.

Namely, each swing loader 4 carries the vulcanized tire 8 from the tire vulcanizing press 2 to the post-cure inflator 3. It has the function of carrying out the cooled tire 9 from the post-cure inflator 3 and carrying it to each discharge position P3 in addition to the function of turning and carrying the vulcanized tire 8 from the tire vulcanizing press 2 to the post-cure inflator 3, which is possessed by the unloader of the conventional tire vulcanizing press 2.

Each discharge conveyor 5, which is a roller conveyor consisting of a plurality of rollers, is situated under each discharge position within the rotating track (a) of each swing loader 4, and longitudinally juxtaposed adjacently to the outside of each nipping position P2 (each lower rim 17) of the post-cure inflator 3. Each discharge conveyor 5 is inclined down from each discharge position P3 toward a carrying-out conveyor 6 so as not to obstruct the rise and fall of the lower rim 17 in each nipping position P2. This discharge conveyor 5 receives the vulcanized (cooled) tire 9 carried to the discharge position P3 by each swing loader 4 to discharge the cooled tire 9 to the carrying-out conveyor 6 by its dead weight. The carrying-out conveyor 6, which is a belt conveyor, is juxtaposed in the rear of the post-cure inflator 3 with a prescribed space to carry the cooled tire 9 discharged from each discharge conveyor 5 to a tire inspecting machine or shipping place.

The carrying procedure of tire in the tire vulcanizer 1 according to the preferred embodiment of this invention will be further described with reference to FIGS. 4a–4d.

When the vulcanization molding by the tire vulcanizing press 2 is terminated, each swing loader 4 is raised and lowered, and rotated to situate the tire chuck 4B between each mold 10. The tire chuck 4B is successively lowered, and each claw 41 is inserted into the vulcanized tire 8 and expanded radially outward, whereby the vulcanized tire 8 is held in the upper bead part 8A.

When the vulcanized tire 8 is held by each swing loader 4, the tire chuck 4B is raised and lowered, and rotated to carry the vulcanized tire 8 from each mold 10 to each nipping position P2 of the post-cure inflator 3. The lower bead part 8B of the vulcanized tire 8 is supported on each lower rim 17 by lowering each swing loader 4, and the nipping is released by contracting each claw 4a radially inward (refer to FIG. 4a).

After the vulcanized tire 8 is supported on each lower rim 17, each swing loader 4 is raised, rotated, and retreated from the post-cure inflator 3 (FIG. 4b).

The lower rim 17 situated in each nipping position P2 is successively raised together with the vulcanized tire 8 to nip the vulcanized tire 8 with each upper rim 16, and the vulcanized tire 8 is expansion cooled by supplying pressure air thereto, and then reversed from the nipping position P2 to the waiting position P1 by the rotation of the reversing shaft 19.

When the cooling in each waiting position P1 is terminated, the cooled tire 9 is reversed from each waiting position P1 to each nipping position P2, and the cooling is continued additionally for one cycle. Before vulcanization of the following tire is terminated, each lower rim 17 is lowered together with the cooled tire 9 to lay the cooled tire 9 into the state capable of carrying-out. Each swing loader 4 is rotated in this state to situate the tine chuck 4B on the cooled tire 9, and each claw 4a is inserted into the cooled tire 9 by lowering, and expanded radially outward, whereby the cooled tire 9 is held in its upper bead part 9A (refer to FIG. 4c).

After the cooled tire 9 is held, the cooled tire 9 is carried to each discharge position P3 within the rotating track (a) together with the tire chuck 4B by raising and rotating each swing loader 4, and situated on each discharge conveyor 5. The cooled tire 9 is carried to each discharge conveyor 5 by lowering each swing loader 4 in this state, and delivered onto each discharge conveyor 5 by contracting each claw 4a radially inward (refer to FIG. 4d, FIG. 1, and FIG. 2).

The cooled tire 9 received by each discharge conveyor 5 is naturally fallen on each discharge conveyor 5 by its dead weight, discharged onto the carrying-out conveyor 6, and carried to a tire inspecting machine or shipping place by the carrying-out conveyor 6 (refer to FIG. 2).

In the discharge of the cooled tire 9 to the carrying-out conveyor 6, the discharge timing is regulated by a stopper (not shown) provided on each discharge conveyor 5 so that the successively carried cooled tires 9 never overlap.

According to the tire vulcanizer 1 of this invention, since the discharge of the tire 9 cooled by the post-cure inflator 3 is performed in each discharge position P3 within the rotating track (a) of each swing loader 4, each discharge conveyor 5 can be arranged from the front side of the post-cure inflator 3, and it is not necessary to arrange the discharge conveyor in the rear of the post-cure inflator 3 as in the past.

Consequently, the tire vulcanizing press 2, the post-cure inflator 3 and the discharge conveyor 5 can be arranged while compressing (reducing) the longitudinal space of the tire vulcanizer 1, and the forward space of the tire vulcanizing press 2 can be extended. Thus, the replacing work of each mold 10 to the tire vulcanizing press 2 can be easily performed by a forklift or the like, and the space for stocking green tires 7 can be also sufficiently ensured.

The tire vulcanizer 1 of this invention may include those shown in FIG. 5–FIG. 8c, which are described later, without being limited to those shown in FIG. 1–FIG. 4.

Figure 5:
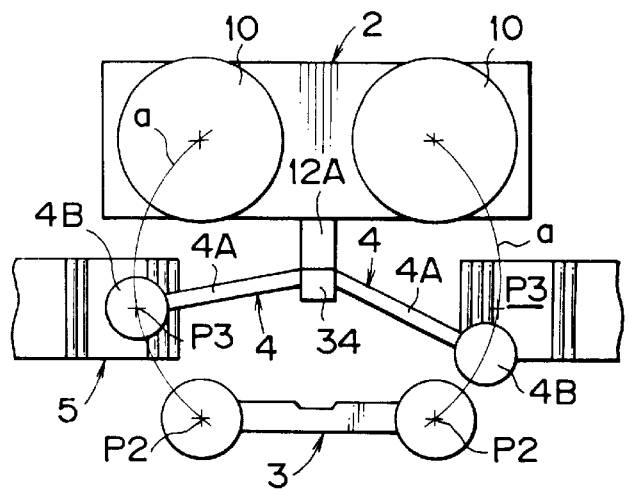
FIG. 5 is a typical view showing one possible embodiment of the tire vulcanizer according to this embodiment.

In FIG. 5, each swing loader 4 is arranged in such a manner as to be capable of rising, falling and rotating with the axis of rotation on the rear center frame 12A (guide base 34) of the tire vulcanizing press 2, and each discharge position P3 of the vulcanized tire 9 is set between the tire vulcanizing press 2 and the post-cure inflator 3. Each discharge conveyor 5 is arranged so as to extend from each discharge position P3 in parallel to the post-cure inflator 3.

Since the discharge position P3 is set between the tire vulcanizing press 2 and the post-cure inflator 3 in this structure, and the discharge conveyor 5 is juxtaposed with the post-cure inflator 3 from there, the longitudinal space between the tire vulcanizing press 2 and the post-cure inflator 3 can be compressed (reduced).

Figure 6A:
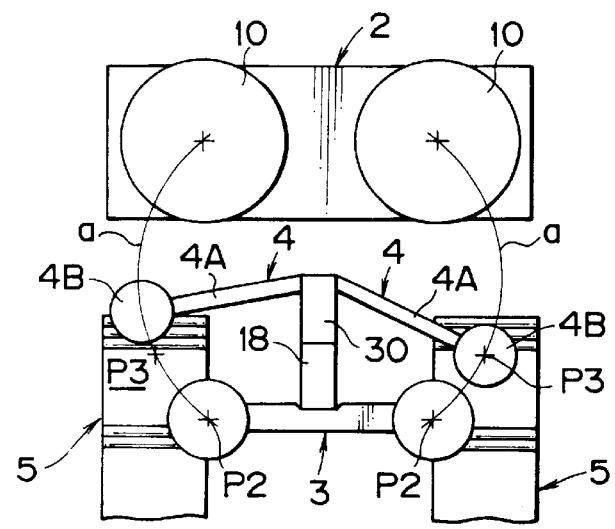
FIGS. 6a and 6b are typical views showing a further possible embodiment of the tire vulcanizer according to this embodiment.
Figure 6B:
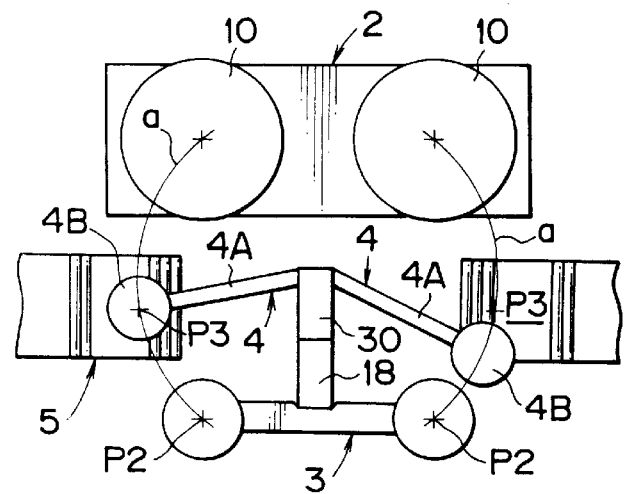

In FIGS. 6a and 6b, each swing loader 4 is arranged in such a manner as to be capable of rising, falling and rotating with its axis of rotation on a guide strut 30 (support part) provided on the center frame 18 of the post-cure inflator 3, and the discharge position P3 of the cooled tire 9 is set between the tire vulcanizing press 2 and the post-cure inflator 3. The arrangement mode of each discharge conveyor 5 is changed.

In FIG. 6a, each discharge conveyor 5 is arranged so as to extend from each discharge position P3 to the rear of the post-cure inflator 3. In FIG. 6b, each discharge conveyor 5 is juxtaposed laterally with the post-cure inflator 3 from each discharge position P3.

In these structures, also, the longitudinal space between the tire vulcanizing press 2 and the post-cure inflator 3 can be compressed (reduced).

In FIGS. 7a–7c, each swing loader 4 is arranged on the guide shaft 31 (support part) provided on the outside of each mold 10 or each nipping position P2 in such a manner as to be capable of rising, falling and rotating, with its axis of rotation being situated between the tire vulcanizing press 2 and the post-cure inflator 3. The arrangement mode of each discharge conveyor 5 is changed.

In FIG. 7a, each discharge position P3 is set within the rotating route (a) between the tire vulcanizing press 2 and the post-cure inflator 3, and each discharge conveyor 5 is arranged so as to extend from each discharge position P3 to the rear of the post-cure inflator 3. In FIG. 7b each discharge position P3 is set within the rotating route (a) between the tire vulcanizing press 2 and the post-cure inflator 3, and each discharge conveyor 5 is juxtaposed laterally with the post-cure inflator 3. In FIG. 7c, each discharge position P3 is set within the rotating route (a) in the rear of the post-cure inflator 3, and each discharge conveyor 5 is juxtaposed laterally with the post-cure inflator 3.

In these structures, also, the longitudinal space between the tire vulcanizing press 2 and the post-cure inflator 3 can be compressed (reduced).

Figure 8A:
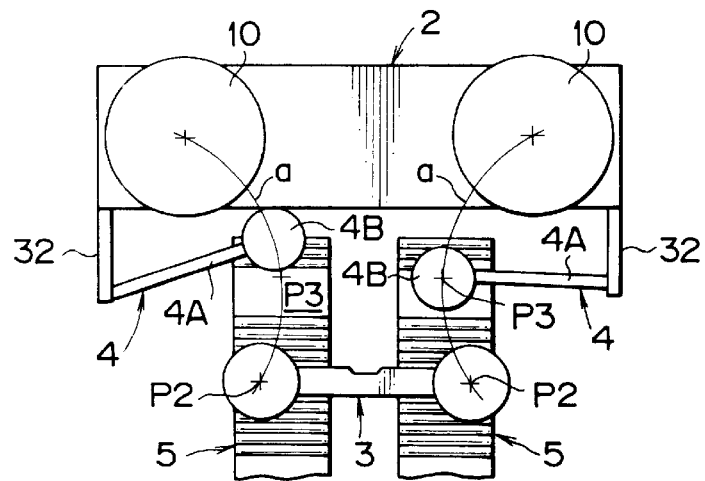
FIGS. 8a, 8b, and 8c are typical views showing a still further possible embodiment of the tire vulcanizer according to this embodiment.
Figure 8B:
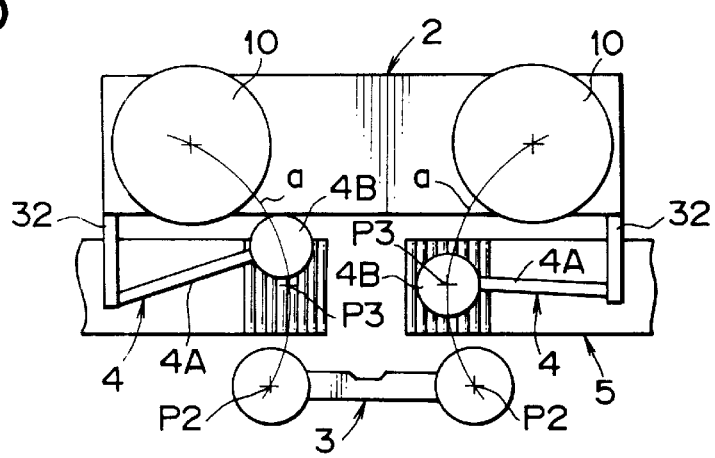
Figure 8C:
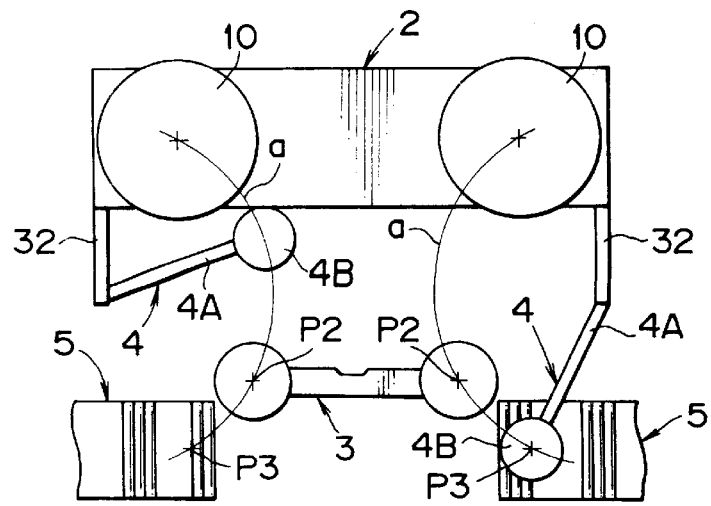

In FIGS. 8a–8c, each swing loader 4 is arranged in such a manner as to be rising, falling and rotating with its axis of rotation on a guide surface 32 (support part) provided on both sides of the tire vulcanizing press 2. The arrangement mode of each discharge conveyor is changed.

In FIG. 8a, each discharge position P3 is set within the rotating route (a) between the tire vulcanizing press 2 and the post-cure inflator 3, and each discharge conveyor 5 is arranged so as to extend from each discharge position P3 to the rear of the post-cure inflator 3. In FIG. 8b, each discharge position P3 is set within the rotating route (a) between the tire vulcanizing press 2 and the post-cure inflator 3, and each discharge conveyor 5 is arranged so as to be juxtaposed laterally with the post-cure inflator 3. In FIG. 8c, each discharge position P3 is set within the rotating route (a) in the rear of the post-cure inflator 3, and each discharge conveyor 5 is arranged so as to be juxtaposed laterally with the post-cure inflator 3 from each discharge position P3.

In these structures, also, the longitudinal space between the tire vulcanizing press 2 and the post-cure inflator 3 can be compressed (reduced).

In those shown in FIG. 1–FIG. 8c, a discharge conveyor of the type of linearly discharging the cooled tire 9 is shown as each discharge conveyor 5, but a circularly discharging type may be adapted without being limited to the above. Further, the mechanism of inclining each discharge conveyor 5 to receive and discharge the cooled tire 9 to the carrying-out conveyor 6 is described herein, but a mechanism capable of automatically feeding the cooled tire 9 may be adapted without being limited thereby.

For the arrangement mode of the swing loader, the swing loader can be arranged variously on the post-cure inflator and the like in addition to the tire vulcanizing press. Consequently, the discharge position within the rotating track of the swing loader is determined in relation to a facility such as factory to set the tire vulcanizer, and the arrangement mode of the discharge conveyor and the swing loader is changed on the basis of this determination, whereby the swing loader can be set while effectively compressing (reducing) the longitudinal space between the tire vulcanizing press and the post-cure inflator.

Since the swing loader can be used for carrying of both the vulcanized tire and the cooled tire, the existing unloader for tire vulcanizing press can be used for carrying both the vulcanized tire and the cooled tire without separately providing an equipment for carrying the cooled tire.

Figure 9:
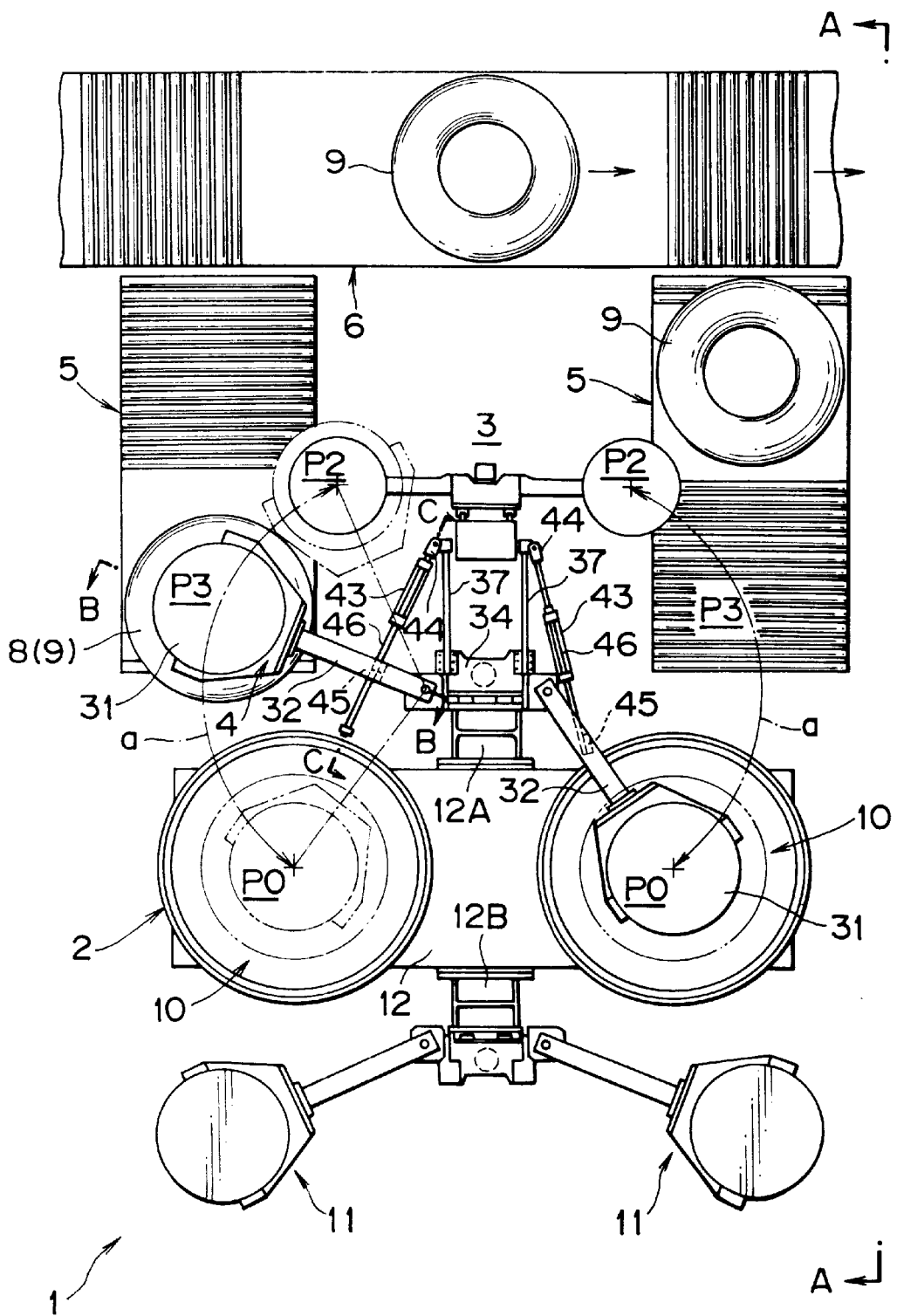
FIG. 9 is a plan view showing the overall structure of the tire vulcanizing device according to this embodiment.
Figure 10:
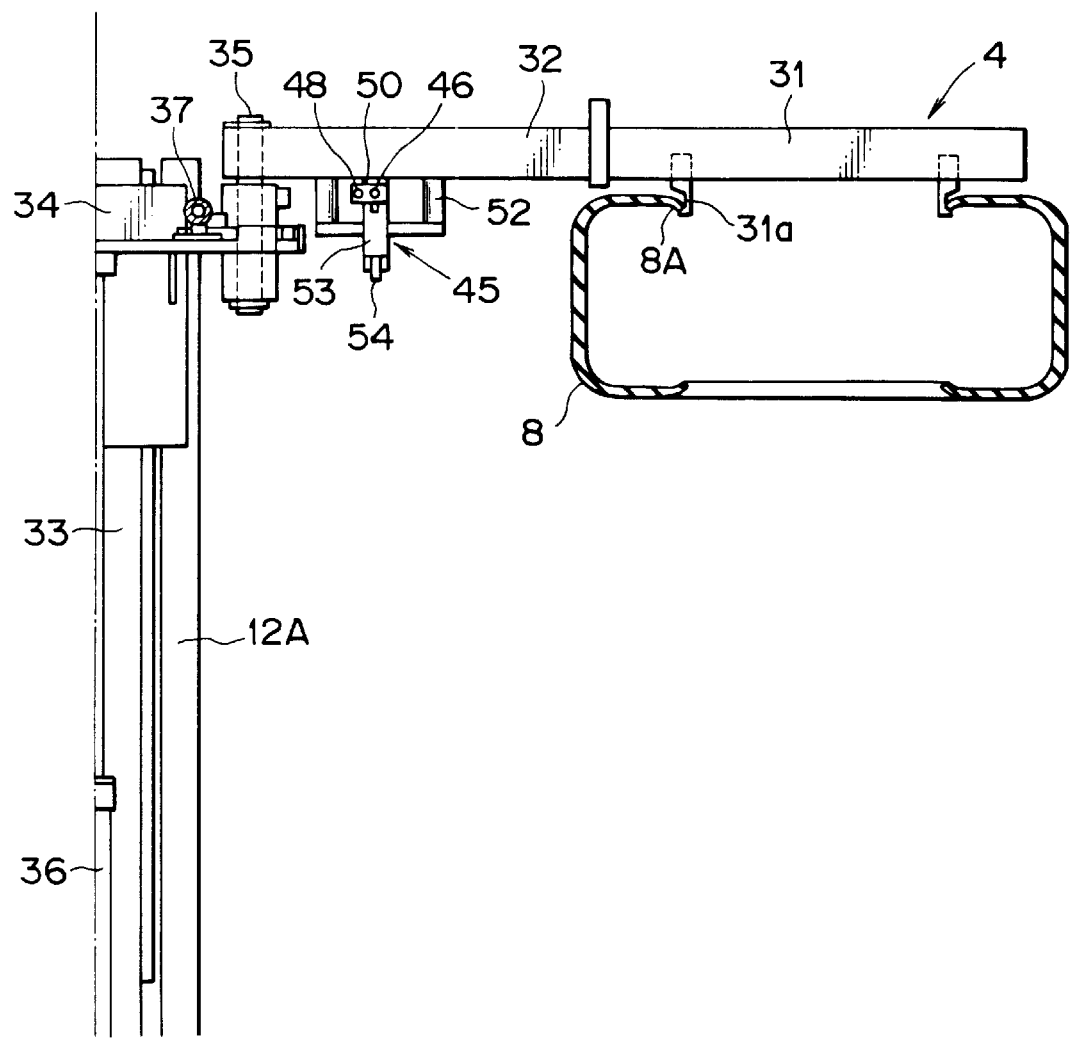
FIG. 10 is a side view taken along the line B—B of FIG. 9, which shows the structure of a carrying loader.
Figure 11:
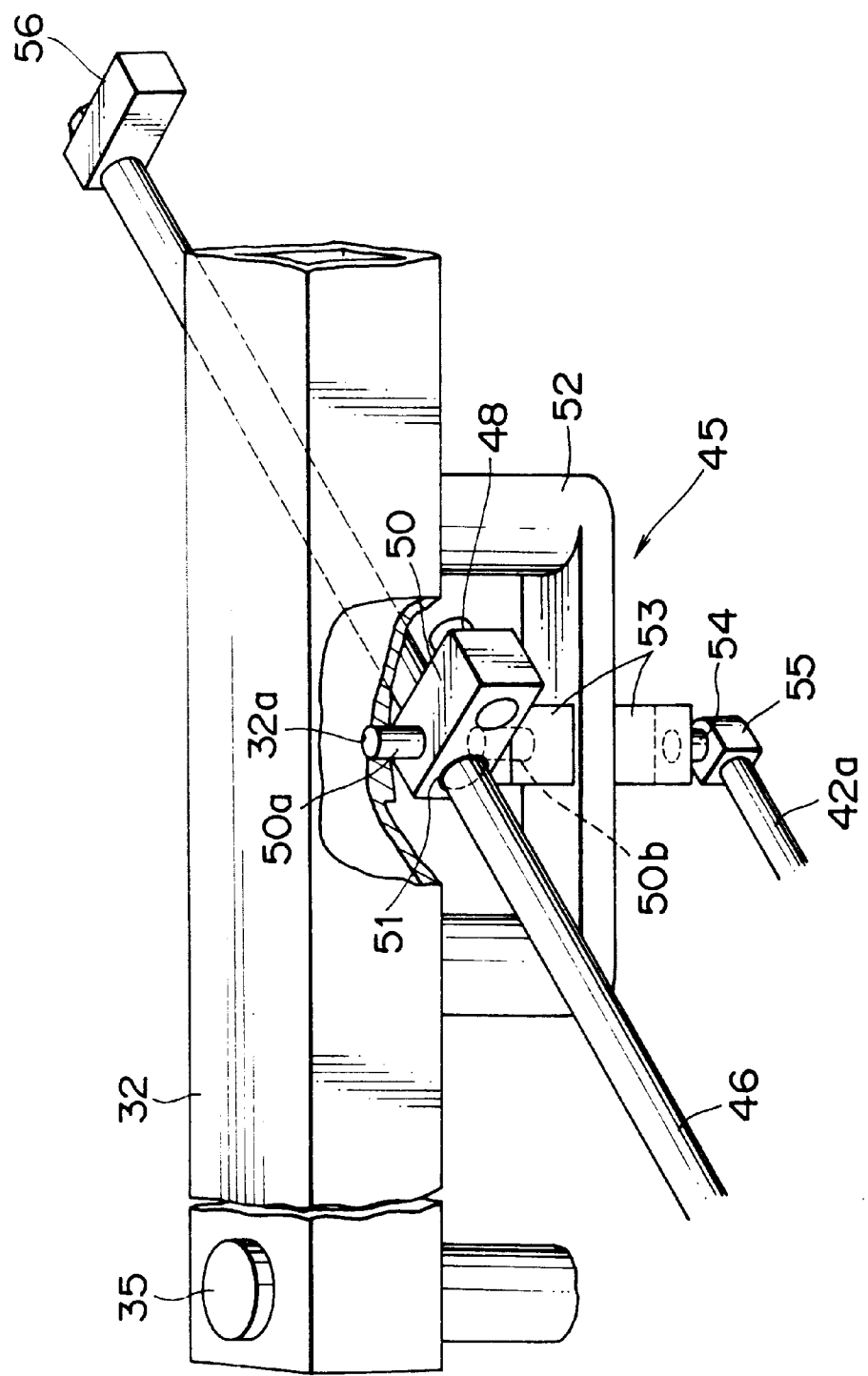
FIG. 11 is a perspective view illustrating about the center lower part of a rotating arm.

One preferred embodiment of the swing loader according to the tire vulcanizer of this invention is described in detail on the basis of FIG. 9 to FIG. 12b. FIG. 10 is a vertical sectional view taken along the line B–B of FIG. 9, and FIG. 11 is a perspective view illustrating the second rod fixing part of the rotating arm. FIG. 12b is a vertical sectional view taken along the line C–C of FIG. 9, and FIG. 12a is its plan view. The perspective view taken along the line A–A of FIG. 9 is substantially the same as FIG. 2.

The swing loader, particularly, the carrying-out swing loader 4 (hereinafter referred to as carrying-out loader for short) is illustrated in detail, but the carrying loader of this invention may be a carrying-in loader 11 without being limited by this. The green tire placing base includes a multistage tire receiving base as well as a turntable type tire holder, depending on its state, and the carrying loader of this invention will be suitably applied to a one required to stop in a middle position for regulating the height of the tire chuck according to the height of the tire vulcanizing press 2 in addition to the position for holding the green tire 7 and the position for releasing the green tire 7 in the mold 10.

As shown in FIG. 9, the carrying-out loader 4 comprises a tire chuck 31, a rotating arm 32, a drive part 43 and a guide rod 46, and the base end of the rotating arm 32 is mounted on the guide base 34 capable of rising and falling, which is rotatably arranged on the rear side guide strut 12A of the tire vulcanizing press 2. The guide rod 46 is laid over from the top end of a fixing rod 37 fixed to the guide base 34 to about the center lower surface of the rotating arm 32 so as to extend from the tire vulcanizing press 2 to the post-cure inflator 3. The guide rod 46 is rotatably connected in a first rod fixing part 44 formed on the end of the fixing rod 37, and the guide rod 46 is rotatable and slidable in a second rod fixing part 45 formed on about the enter lower surface of the rotating arm 32.

As shown in FIG. 10, the rotating arm 32 has a tire chuck 31 at the end, and it is supported by the guide base 34 through a shaft 35 provided on the base end so that the tire chuck 31 is rotatable between the tire vulcanizing press 2 and the post-cure inflator 3. The tire chuck 31 comprises three or more claws 31a radially expanded outward and contracted inward at once by a cylinder not shown, which are circumferentially arranged at equal intervals, so that the upper bead part 8A of the vulcanized tire 8 is held by inserting each claw 31a laid in the contracted state into the vulcanized tire 8 and then expanding it radially outward, and each tire 8 is released by contracting each claw 31a radially inward. The root side of the fixing rod 37 is fixed to the guide base 34 by which the rotating arm 32 is supported. The guide base 34 raises and lowers the guide rail 33 of the rear side guide strut 12A by the expansion and contraction of a fluid pressure cylinder 36. The second rod fixing part 45 comprises a U-shaped bracket 52 fixed to about the central lower surface of the rotating arm 32, a bearing member 53 fixed to the U-shaped bracket 52, and a suspended shaft 54, and it rotatably supports a slide block 50 for freely fitting and supporting the guide rod 46.

As shown in FIG. 11, the second rod fixing part 45 provided on about the central lower surface of the rotating arm 32 comprises the slide block 50 pierced by the guide rod 46 to slidably support it, the U-shaped bracket 52 and the bearing member 53 for rotatably support the slide block 50, and the suspended shaft 54 for rotatably supporting the end of the second rod 42a.

The slide block 50 has concentric support shafts 50a, 50b just above and just under an insert hole 51 for the guide rod 46, the upper support shaft 50a is freely fitted to a hole 32a formed in the lower surface of the rotating arm 32, and the lower support shaft 50b is freely fitted to a hole formed in the upper surface of the receiving member 53 supported by the bracket 52. The U-shaped bracket 52 consists of a substantially U-shaped member, which is fixed to the lower surface of the rotating arm 32 by means of welding so that the bearing member 53 can keep a proper distance with the rotating arm 32. The suspended shaft 54 is suspended from the lower surface of the bearing member 53 concentrically with the support shafts 50a, 50b to support a metal fitting 55. The metal fitting 55 is connected to the end of the second rod 42a.

A cushioning member 48 is mounted on the slide block 50 so as to be contactable with a stopper 56 provided on the free end of the guide rod 46.

A first rod fixing part 44 comprises a fixture 37a fixed to the end of the fixing rod 37 and a shaft 38 freely fitted to the fixture 37a as shown in FIG. 12b, and the guide rod 46 and the second rod 41a are connected to the upper and lower ends of the shaft 38 by metal fittings 57, 58, respectively.

The metal fitting 57 in the end part of the guide rod 46 is protruded upward so as to be usable also as a stopper contactable with the cushioning member 47 connected to the drive part 43.

The drive part 43 comprises a first hydraulic cylinder 41 and a second hydraulic cylinder 42 whose cylinder parts are mutually connected as shown in FIG. 12b. A frame body 59 connects the rod side flange of the first hydraulic cylinder 41 to the cylinder side flange of the second hydraulic cylinder 42, and a frame 60 connects the cylinder side flange of the first hydraulic cylinder 41 to the rod side flange of the second hydraulic cylinder 42. Cylindrical parts 59a, 60a are formed on the frames 59, 60, and freely fitted to the guide rod 46. The cushioning member 47 is mounted on the cylindrical part 59a of the bracket 59. Since, in this invention, the cylinder parts of the hydraulic cylinders 41, 42 are vertically superposed and connected in such a way as to set the expanding direction of each rod in the cylinders to be in the reverse direction each other, the width of the equipment can be minimized, and the rotating arm can be shortened for this portion. Thus, the rotating moment can be minimized to improve the stop position precision.

The cushioning members 47, 48 are provided on members moving on the guide rod 46 (the frame 59 or the slide block 50), and stoppers 56, 57 are provided on the guide rod 46. Thus, since the cushioning members 47, 48 touch the stoppers 56, 57 regularly at the same angle (right angle) even if the rotating arm 32 is rotated, the stop position precision can be further improved with a high shock absorbing effect, and the durability is also improved. The cushioning members and the stoppers may be provided on both ends of the guide rod 46 and on the sliding drive part 43 side, respectively.

The operation of the carrying-out loader 4 is described on the basis of FIG. 12a to FIG. 15b.

This carrying-out loader 4 can be precisely stopped in three positions of the OUT position P2 (refer to FIGS. 12a, 12b and FIG. 13), the middle position P3 (refer to FIGS. 14a and 14b) and the IN position P0 (refer to FIGS. 15a and 15b) within the track (a) of the tire chuck 31 to the tire vulcanizing press 2 by the extension and contraction of the first and second rods 41a, 42a.

Figure 13:
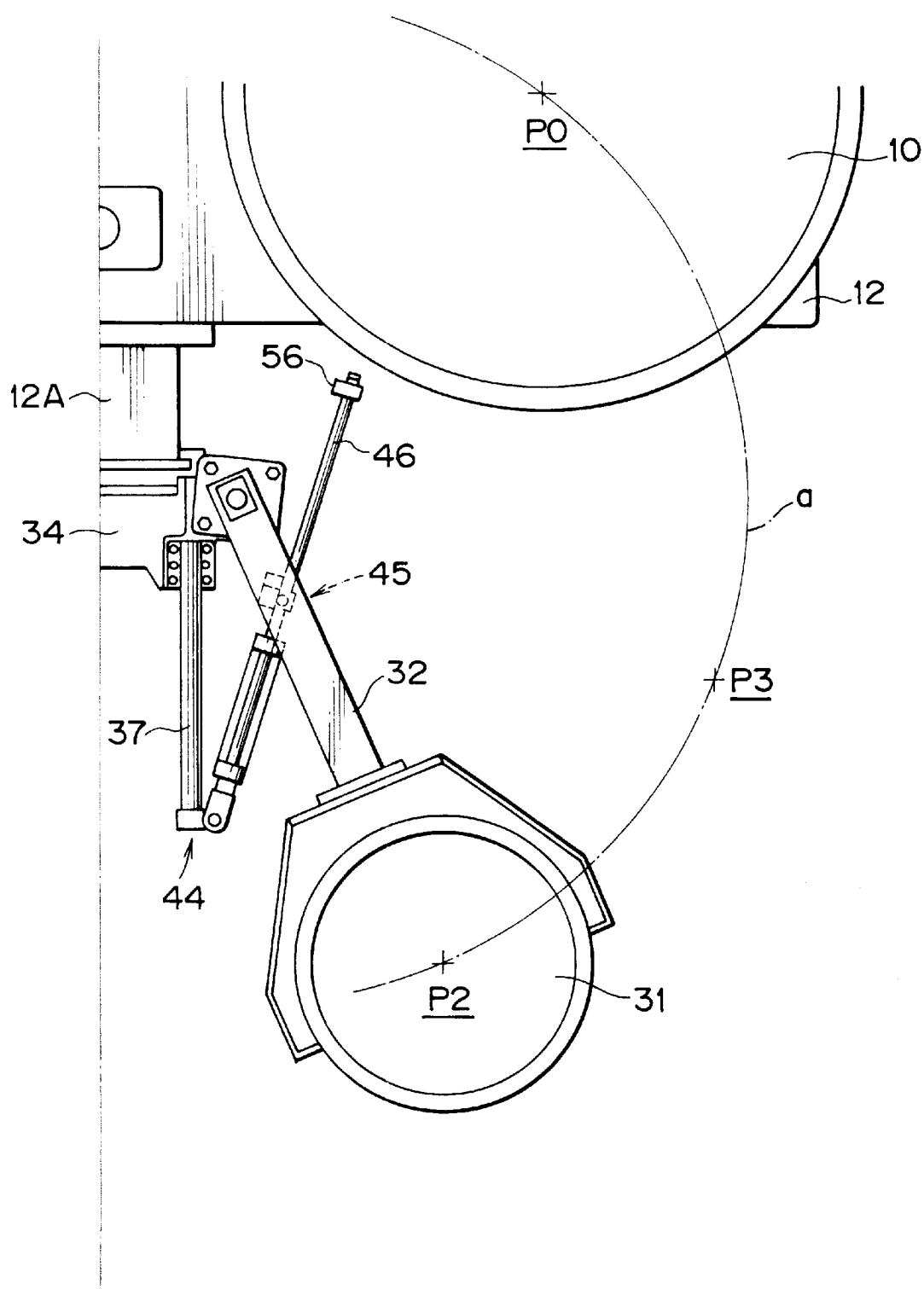
FIG. 13 is a view illustrating the operation of the carrying loader, wherein a tire chuck is in an OUT position P2.

As shown in FIGS. 12a and 12b, when both the first and second rods 41a, 42a are contracted to the shortest, the cushioning member 47 makes contact with the stopper 57. The rotating arm 32 is then attracted to the fixing rod 37 side along the guide rod 46, as shown in FIG. 13, to stop the tire chuck 31 in the OUT position P2 which is also the tire holding position of the post-cure inflator 3.

Figure 14A:
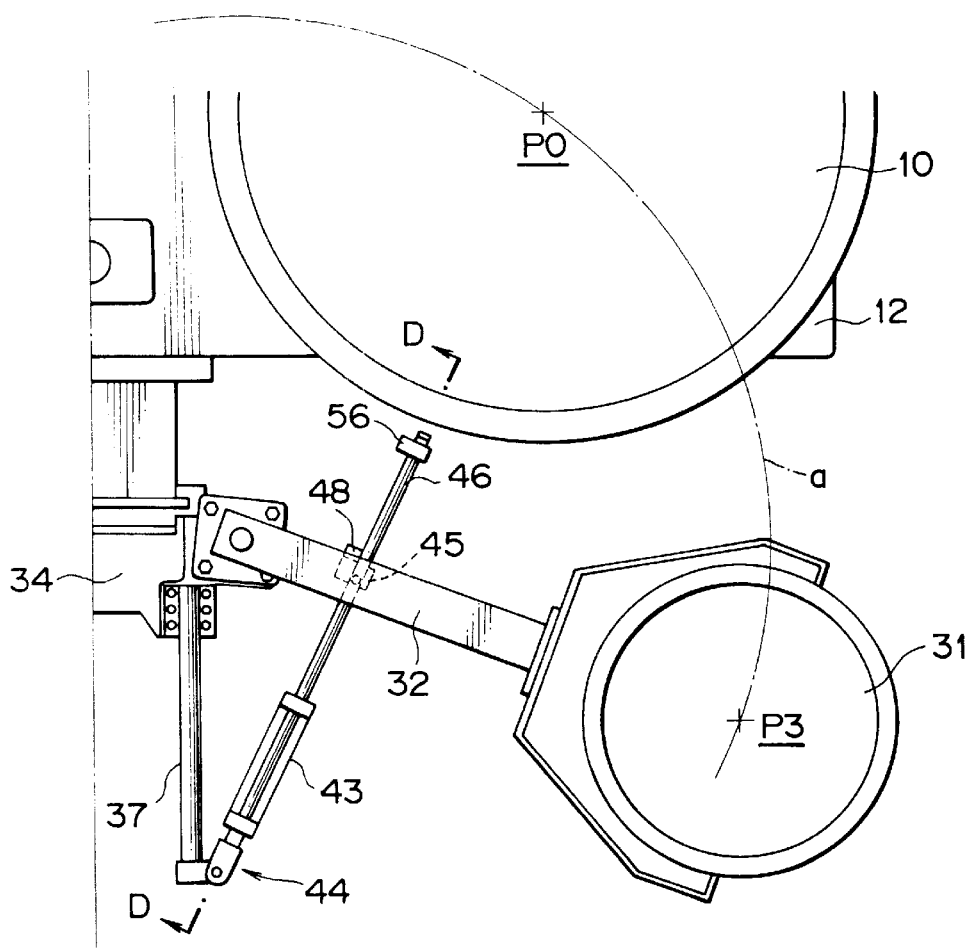
FIG. 14a is a view illustrating the operation of the carrying loader, wherein the tire chuck is in a middle position P3.
Figure 14B:
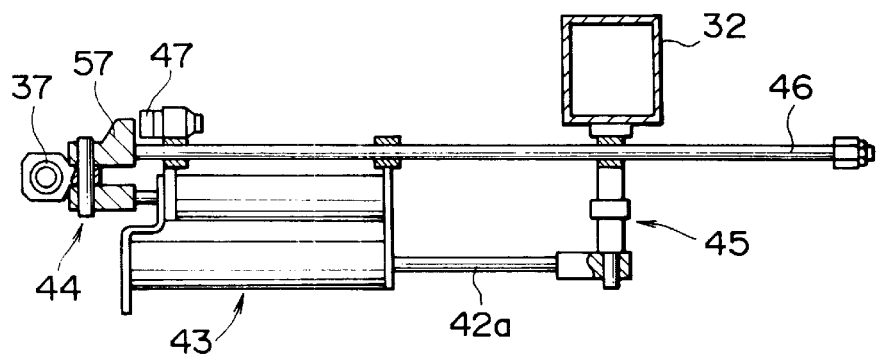

When only the second rod 42a is then extended as shown in FIGS. 14a and 14b, the stopper 57 touches the cushion member 57 to prevent the movement of the drive part 34, while the second fixing part 45 gets away from the fixing rod 37 on the guide rod 46, and rotates the rotating arm 32 to stop the tire chuck 31 in the middle position P3. In the middle position P3, the tire chuck 31 is retreated once after delivering the vulcanized tire 8 to the post-cure inflator 3 in the OUT position P2, or the vulcanized and cooled tire 8 is delivered to the discharge conveyor 5 (refer to FIG. 2 and FIG. 9) situated under the middle position P3 after receiving the vulcanized tire 8 cooled by the post-cure inflator 3 in the OUT position P2.

Figure 15A:
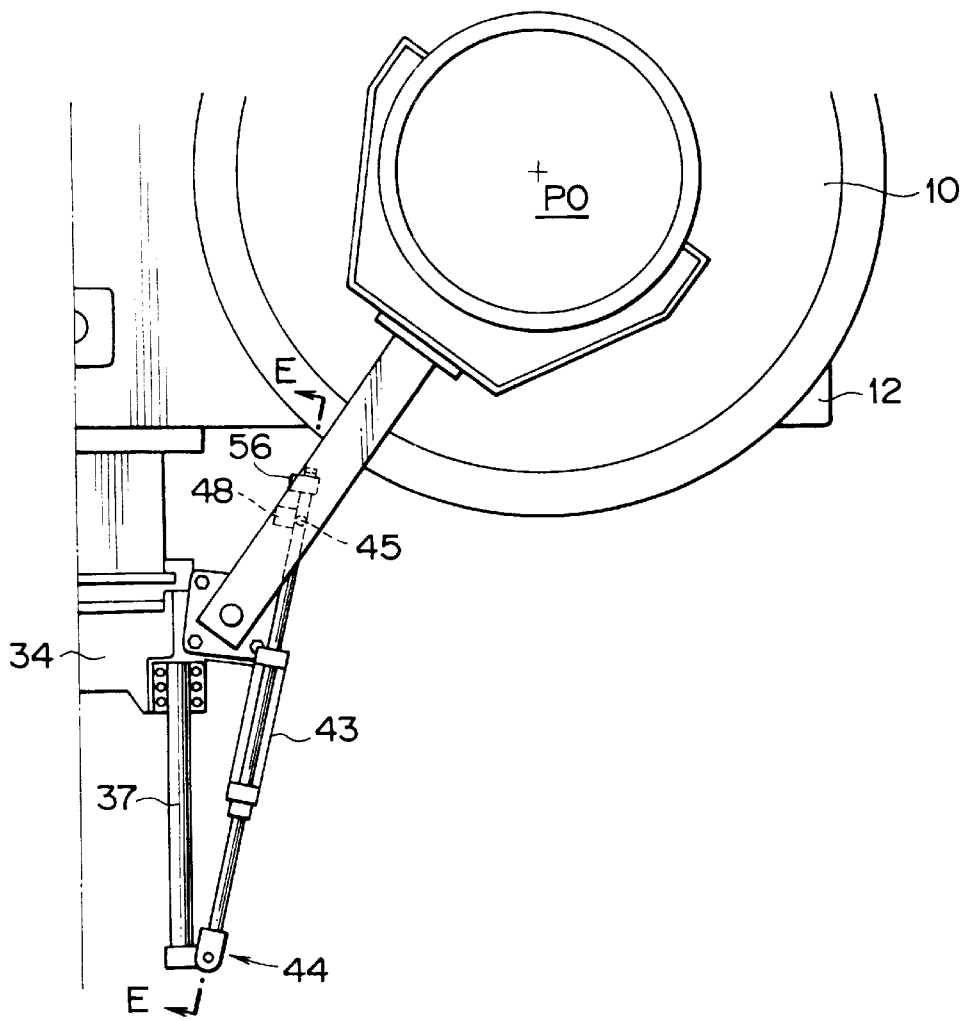
FIG. 15a is a view illustrating the operation of the carrying loader, wherein the tire chuck is in an IN-position P1.
Figure 15B:
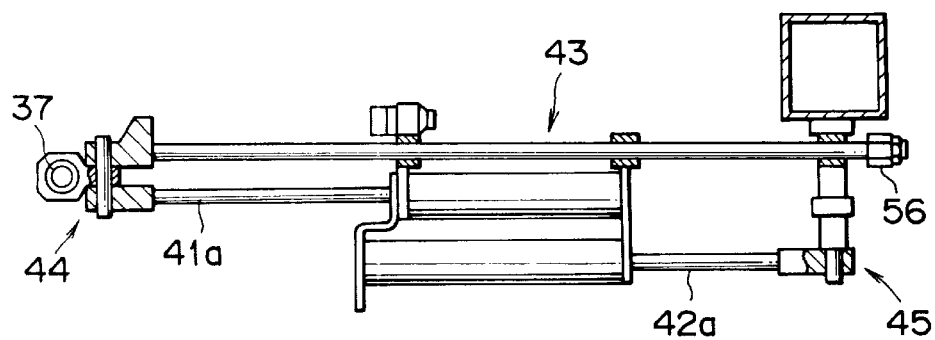
Figure 16:
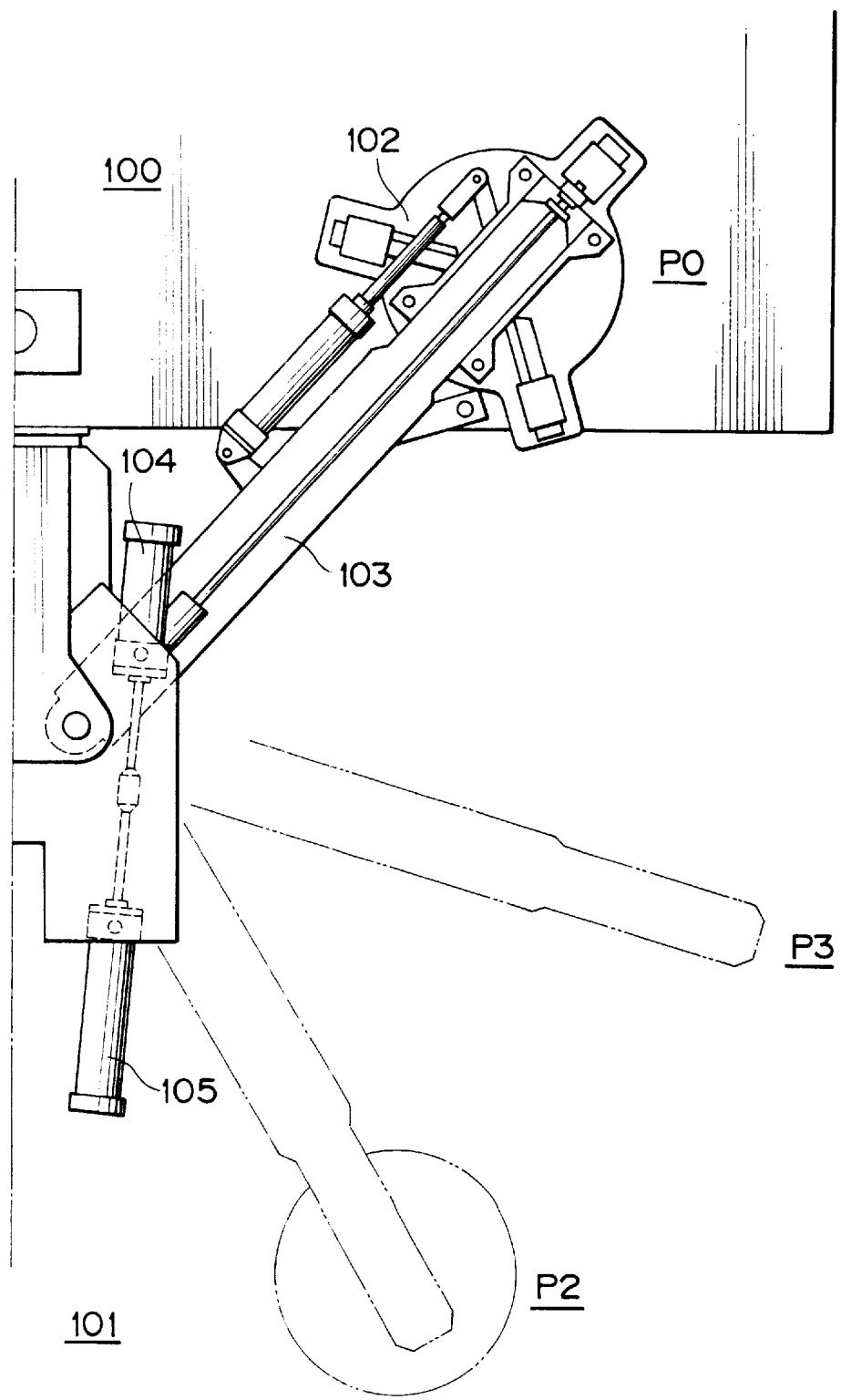
FIG. 16 is a view illustrating the carrying loader according to a conventional tire vulcanizer.

Further, when the first rod 41a is also extended, and both the first and second rods 41a, 42a are extended to the longest, as shown in FIGS. 15a and 15b, the cushioning member 48 touches the stopper 56 (refer to FIGS. 12a, 15a) to absorb the impact, so that the vulcanized tire 8 can be precisely stopped in the IN position P0. In the IN position P0, the vulcanized tire 8 vulcanized within the mold 10 is held. The held vulcanized tire 8 is carried to the post-cure inflator 3 (the OUT position P2).

Since the first and second hydraulic cylinders 41, 42 for rotating the carrying-out loader 4 are superposed and arranged between the respective fixing parts in this invention, or the first fixing part 44 and the second fixing part 45, a member (cylinder) as is protruded from the fixing parts to the post-cure inflator 3 side is eliminated, and the distance between the tire vulcanizing press 2 and the post-cure inflator 3 can be shortened. The rotating arm can be thus shortened by this position, and the rotating moment can be minimized to improve the stop position precision. Further, since the discharge position for discharging the tire cooled by the post-cure inflator is set in the middle position P3 within the rotating track of the swing loader, the discharge conveyor 5 can be also arranged close to the carrying-out loader 4, and synergistic effects of compact arrangement of the whole tire vulcanizing device 1 (refer to FIG. 9) and minimization of the necessary setting area can be exhibited. This is based on novel knowledge concerned with the discharge position of tire and the structure of swing loader of the present inventors.

According to this invention, the rotating arm can be shortened by superposing and unifying the cylinder parts of two hydraulic cylinders provided between the rotating arm and the tire vulcanizing press in such a way as to set the expanding direction of each rod in the cylinders to be in the reverse direction each other, the rotating moment is minimized by this portion, and the stop position precision can be improved accordingly. Since the tire vulcanizing press, the post-cure inflator and the like constituting the tire vulcanizing device can be arranged adjacently to each other, the setting space can be minimized to extend the empty space around the device.

Further, since the guide rod for sliding the drive part of the cylinder and the rotating arm-side rod fixing part is rotatably provided on the tire vulcanizing press-side rod fixing part, and the stoppers and cushioning members are provided on the guide rod and on members slid along the guide rod (the drive part and the rotating arm side rod fixing part), respectively, the cushioning members can touch the stoppers regularly vertically regardless of the angle of the rotating arm. Therefore, effects of further improved stop position precision with high cushioning effect and enhanced durability can be provided.

Where in the foregoing description reference has been made to specific components or integers of the invention having known equivalents than such equivalents are herein incorporated as if individually set forth.

Although this invention has been described by way of example and with reference to possible embodiments thereof it is to be understood that modifications or improvements may be made thereto without departing from the scope of the invention as defined in the appended claims.

The entire disclosure of Japanese Patent Application Nos. 10-72067 filed on Feb. 20, 1998 and 10-74115 filed on Feb. 23, 1998 including specification, claims, drawings and summary are incorporated herein by reference in its entirety.

What is claimed is:

1. A tire vulcanizer comprising:
   a tire vulcanizing press configured to vulcanization mold a green tire;
   a post-cure inflator configured to expansion cool the vulcanization molded tire, the post-cure inflator being juxtaposed with the tire vulcanization press; and
   a swing loader configured to carry the tire vulcanization molded by the tire vulcanizing press to the post-cure inflator, the swing loader being further configured to carry the tire cooled by the post-cure inflator to a discharge position located between the tire vulcanizing press and the post-cure inflator and to discharge the tire at the discharge position.

2. A tire vulcanizer according to claim 1 wherein the discharge position for discharging the tire cooled by the post-cure inflator is set within a rotating track of the swing loader.

3. A tire vulcanizer according to claim 2 wherein either one of a frame of the tire vulcanizing press and a frame of the post-cure inflator is provided with a support part for supporting the axis of rotation of the swing loader.

4. A tire vulcanizer according to claim 2 further comprising a discharge conveyor provided under the discharge position, the discharge conveyor being configured to receive the tire discharged by the swing loader at the discharge position and configured to carry the tire to a carrying-out conveyor.

5. A tire vulcanizer according to claim 1 wherein the swing loader comprises an expansible and contractible tire chuck capable of supporting the bead part of an unvulcanized or vulcanized tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame body for supporting the cylinder parts of the first and second hydraulic cylinders one above the other in such a way as to set the expanding direction of each rod in the cylinders to be in the reverse direction each other.

6. A tire vulcanizer according to claim 5 wherein the frame body of the drive part and the rotating arm-side second rod fixing part to which the rod end of the second hydraulic cylinder is pivotally fixed are slidably supported by a guide rod having one end rotatably supported on the tire vulcanizing press-side first rod fixing part to which the rod end of the first hydraulic cylinder is pivotally fixed, and stoppers and cushioning members are provided on the guide rod and on the frame body and the second rod fixing part, respectively.

7. A tire vulcanizer according to claim 2 wherein the swing loader comprises an expansible and contractible tire chuck capable of supporting the bead part of an unvulcanized or vulcanized tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame body for supporting the cylinder parts of the first and second hydraulic cylinders one above the other in such a way as to set the expanding direction of each rod in the cylinders to be in the reverse direction each other.

8. A tire vulcanizer according to claim 4 wherein the swing loader comprises an expansible and contractible tire chuck capable of supporting the bead part of an unvulcanized or vulcanized tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame for supporting the cylinder parts of the first and second hydraulic cylinders one above the other in such a way as to set the expanding direction of each rod in the cylinders to be in the reverse direction each other.

9. A tire vulcanizer according to claim 7 wherein the frame body of the drive part and the rotating arm-side second rod fixing part to which the rod end of the second hydraulic cylinder is pivotally fixed are supported by the guide rod having one end rotatably supported by the tire vulcanizing press-side first rod fixing part to which the rod end of the first hydraulic cylinder is pivotally fixed, and stoppers and cushioning members are provided on the guide rod and on the frame and the second rod fixing part, respectively.

10. A tire vulcanizer according to claim 8 wherein the frame body of the drive part and the rotating arm-side second rod fixing part to which the rod end of the second hydraulic cylinder is pivotally fixed are slidably supported by the guide rod having one end rotatably supported by the tire vulcanizing press-side first rod fixing part to which the rod end of the first hydraulic cylinder is pivotally fixed, and stoppers and cushioning members are provided on the guide rod and on the frame and the second rod fixing part, respectively.

11. A tire vulcanizer according to claim 3 wherein a discharge conveyor for receiving the cooled tire discharged from the swing loader and carrying this tire to a carrying-out conveyor is provided under the discharge position.

12. A tire vulcanizer according to claim 3 wherein the swing loader comprises an expansible and contractible tire chuck capable of supporting the bead part of an unvulcanized or vulcanized tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame body for supporting the cylinder parts of the first and second hydraulic cylinders one above the other in such a was as to set the expanding direction of each rod in the cylinders to be in the reverse direction each other.

13. A tire vulcanizer according to claim 11 wherein the swing loader comprises an expansible and contractible tire chuck capable of supporting the bead part of an unvulcanized or vulcanized tire, a rotatable rotating arm having the tire chuck on the top end, whose base end is supported by the tire vulcanizing press, and a drive part consisting of a first hydraulic cylinder whose rod end is pivotally fixed to the tire vulcanizing press side, a second hydraulic cylinder whose rod end is pivotally fixed to the rotating arm side, and a frame for supporting the cylinder parts of the first and second hydraulic cylinders one above the other in such a way as to set the expanding direction of each rod in the cylinders to be in the reverse direction each other.

14. A tire vulcanizer according to claim 12 wherein the frame body of the drive part and the rotating arm-side second rod fixing part to which the rod end of the second hydraulic cylinder is pivotally fixed are supported by the guide rod having one end rotatably supported by the tire vulcanizing press-side first rod fixing part to which the rod end of the first hydraulic cylinder is pivotally fixed, and stoppers and cushioning members are provided on the guide rod and on the frame and the second rod fixing part, respectively.

15. A tire vulcanizer according to claim 13 wherein the frame body of the drive part and the rotating arm-side second rod fixing part to which the rod end of the second hydraulic cylinder is pivotally fixed are slidably supported by the guide rod having one end rotatably supported by the tire vulcanizing press-side first rod fixing part to which the rod end of the first hydraulic cylinder is pivotally fixed, and stoppers and cushioning members are provided on the guide rod and on the frame and the second rod fixing part, respectively.

* * * * *